March 25, 1947.    A. E. THOMPSON    2,417,847
TELEGRAPH SYSTEM
Filed Aug. 25, 1942

Inventor.
ALFRED E. THOMPSON.
BY Ed Thinney
ATTORNEY

Patented Mar. 25, 1947

2,417,847

UNITED STATES PATENT OFFICE 2,417,847

TELEGRAPH SYSTEM

Alfred Edward Thompson, Croydon, England, assignor to Creed and Company Limited, Croyden, England, a British company Application August 25, 1942, Serial No. 456,015
In Great Britain July 9, 1937

7 Claims. (Cl. 178—22)

This invention relates to telegraph systems and more particularly to means for ensuring that the signals shall not be picked up by any unauthorised person.

The change of current at the beginning and end of a telegraph impulse gives rise to electromagnetic waves which can influence inductively any other circuits in the neighbourhood of the wire over which the signals are being transmitted, and thus enables the signals carried by the telegraph wire to be received by suitable sensitive devices placed within the neighbourhood of the wire.

It has previously been proposed, in order to lessen the probability of signals being received by such devices within the neighbourhood of the wire, to limit the spectrum of frequencies sent out by the transmitting mechanism by using electric filters in the telegraph circuit. The use of such filters however reduces the signalling speed of the line, and greatly attenuates the strength of the received signals. Accordingly, therefore, sensitive devices at the receiving end of the wire have been necessary.

In connection with telegraph systems operated by transmitting keys actuated manually it has also been proposed to effect secret signalling by superposing the telegraph impulses upon an uninterrupted series of impulses of uniform length, and the telegraph impulse signals are constituted by a change in the polarity of the impulses being sent out, so that in this way it becomes possible to receive the signals by means of devices connected to the wire that are responsive to changes of polarity, whereas it is impossible to pick up the signals by induction by known sensitive devices placed in the neighbourhood of the wire.

The object of the present invention is to adapt this system of signalling to a machine telegraph and the invention consists in telegraph transmitting apparatus comprising a continuously rotating shaft interrupting current sent to line during both signalling and non-signalling periods, a rotatable shaft for transmitting telegraph signals by reversing the direction of the current in accordance with the signal impulses during its rotation and means for rotating the rotatable shaft in synchronism with the continuously rotating shaft.

The invention also consists in telegraph transmitting apparatus comprising a continuously rotating shaft having thereon means such as a cam for operating an interrupter in the line circuit, a rotatable shaft having thereon means such as a cam for reversing the polarity of a current source connected to the line circuit through said interrupter, and signalling means for operating clutch means to clutch said rotatable shaft to said rotating shaft, said clutch means being operative only in definite positions of said continuously rotating shaft.

As one of the principal applications of this invention is for military signalling purposes in battle areas, the invention will be described as applied to a simple portable form of transmitter and receiver which has been specially designed for use in such areas by unskilled persons. In such apparatus a series of impulses is sent out from the transmitter, the number of impulses sent for a particular letter being dependent upon the movement of a typewheel from the position of the preceding letter to a position representing the letter transmitted and successive impulses being of opposite polarity. At the receiving end the rotation of the typewheel through a corresponding number of steps is controlled by the received signals.

When the printing wheel has been brought to the position denoted by the depressed key the printing action is initiated by the typewheel at the receiver remaining at rest for longer than a predetermined time. As applied to apparatus of this kind every impulse sent from the transmitter comprises a current and a no-current interval, whilst successive impulses for positioning the typewheel are of opposite polarity. Between each such series of impulses is a number of impulses of a polarity the same as that of the last impulse required to bring the wheel to the desired position with intervals of no-current between them. The transmitted signals thus comprise an unbroken series of impulses of equal length. Although these impulses differ in polarity it is impossible to detect this difference in the very sensitive devices that must be used if such signals are to be picked up by unauthorised persons since such sensitive devices rely upon a telephone receiver as a detecting instrument.

The invention will be better understood from the following description of one embodiment thereof, reference being made to the accompanying drawings, in which.

In carrying our invention into effect we employ a continuously driven shaft $a$ tending to drive a secondary shaft $b$ through a suitable clutch $c$ of the two position dog clutch type. The secondary shaft, however, is normally held against rotation by the engagement of a detent lever $d$ with a detent $e$, and is arranged to drive through suitable gears $f$ a hollow sleeve $g$ to which is attached an arm $h$ mounted so that it moves above a disc $i$ bearing round its periphery the characters to be transmitted. For each character there is a corresponding key $k$ (one only being shown) and by means of any well-known keybar interlocking mechanism depression of one key releases the key previously depressed. A bellcrank $l$ carried by the arm $h$ is freed by the release of the keybar with which it is in engagement, and is connected by means of a push rod $l^1$ to a second bellcrank $l^2$ which engages by means of a push rod $l^3$ a third bellcrank $l^4$ connected by a link $m$ with an arm $m^1$ mounted on a rockshaft $m^2$ which carries the detent lever $d$ above referred to. Thus when a key is released by the depression of a second key the detent lever $d$ is withdrawn from engagement with the detent $e$ and the secondary shaft $b$ is driven from the continuously driven shaft $a$ and in turn drives the arm $h$ carried by the hollow sleeve $g$ until the bellcrank $l$ carried by said arm comes into contact with the second key that has been depressed. During the rotation of the secondary shaft $b$ a cam $n$ thereon by means of a lever $n^1$ operates a contact lever $n^2$ between two contacts $o, o^1$ connected to opposite poles of a split battery $p$, the middle point of which is earthed.

The transmitting line $r$ is connected to a fixed contact $r^1$ and the continuously driven shaft $a$ carries a cam $s$ having two humps 180° apart that co-operate with a cam lever $s^1$ connected by a link $s^2$ with a contact lever $r^2$ co-operating with the fixed contact to which the line is connected.

The two contact levers $n^2$ and $r^2$ are connected together and the humps on the cam $s$ are so arranged with respect to the engagement positions of the driving clutch $c$ that the line contact $r^1$ and its co-operating contact lever $r^2$ make contact whilst the contact lever $n^2$ is resting on one or other of the two fixed contacts $o, o^1$ associated with it. As the driving shaft continues to rotate even when the secondary shaft is arrested the cam $s$ will continue to act even when the last mentioned contact lever is resting on one or other fixed contact during the time between the depression of two keys.

Figure 2:
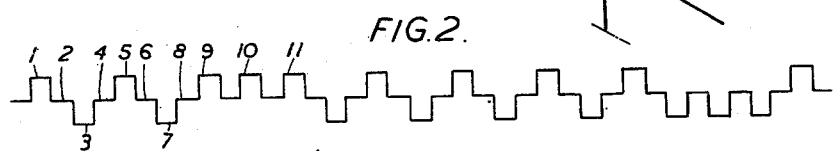
Figure 2 shows a characteristic series of signals.

The signals transmitted are shown in Figure 2. As the contact lever $n^2$ rests against one of the fixed contacts and the second contact lever $r^2$ rests against the fixed line contact $r^1$, a positive pulse 1 is sent out to line. Whilst the contact lever $n^2$ still rests upon the same fixed contact this impulse is interrupted by movement of the contact lever $r^2$ and there follows therefore a no-current interval 2. Assuming that contact lever $n^2$ is being moved by its cam, movement of this lever to the other of the fixed contacts takes place during the interval when the contact lever $r^2$ is away from the fixed line contact $r^1$ and when these contacts again close the first contact lever is resting upon the other fixed contact so that a negative pulse 3 is sent out.

This pulse is again interrupted for an interval 4 by movement of the contact lever $r^2$ and when said contact lever again closes against the line contact the first contact lever $n^2$ has moved over again so that a positive impulse 5 is next sent. This is again succeeded by an interval 6 of no current, and if the transmission of the letter has not yet been concluded a negative impulse 7 is sent out followed again by a no-current impulse 8 and a positive impulse 9. If now the movement of the arm $h$ on the hollow sleeve $g$ has ceased so that contact lever $n^2$ remains upon the same fixed contact, the next current intervals 10 and 11 will be of the same polarity.

Inasmuch as a polarised relay is used in the receiver, the armature of this relay remains upon the contact to which it was last moved during each interval of no current. Such intervals have therefore no effect upon the receiver which operates in precisely the same manner as if they did not exist.

It will be observed, however, that from the point of view of any person attempting to pick up the signals inductively, all that is manifest is an uninterrupted series of impulses each time the current in the line changes, and these would be heard in a telephone receiver as an uninterrupted series of clicks which would convey no information at all.

It is clear that the same method of signalling for the purpose of secrecy could be employed with any code provided double current working be used and a polarised relay be used to receive the signals.

When a telegraph system as described above is used over a line used also for telephony and frequency discrimination to separate the two classes of current is used, the construction of the discriminating circuits for a given degree of freedom from interference depends upon the instantaneous voltage change which occurs at each transit between telegraph signals. In the system described above the current from the transmitter is continuously interrupted and whilst signals in the form of reversals are being sent from the telegraph transmitter, the interruptions are synchronised with the reversals in such a manner that the current is interrupted for half the duration of the interval between successive reversals.

Figure 3:
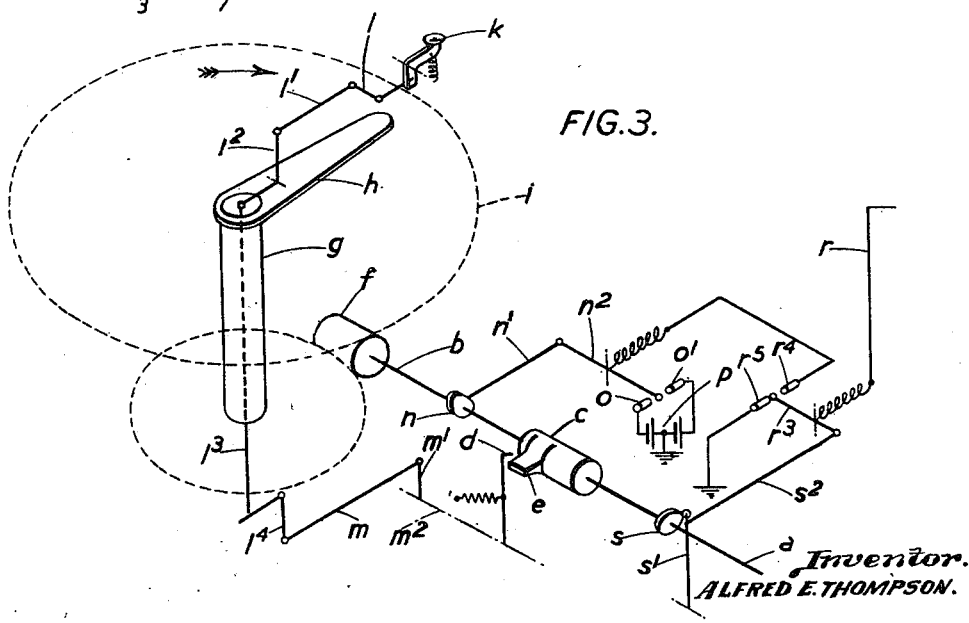
Figure 3 is a view similar to Figure 1 but showing a modified form of apparatus.

According to a modification of the invention shown in Figure 3, therefore, the line is earthed during the interval in which the current is interrupted. By this means the condensers in the circuit of the telephone apparatus (not shown) which are used to separate the telephone currents from the telegraph currents, are enabled to discharge to earth between each voltage change produced by the telegraph signals, and interference by the telegraph signals is minimised.

Figure 1:
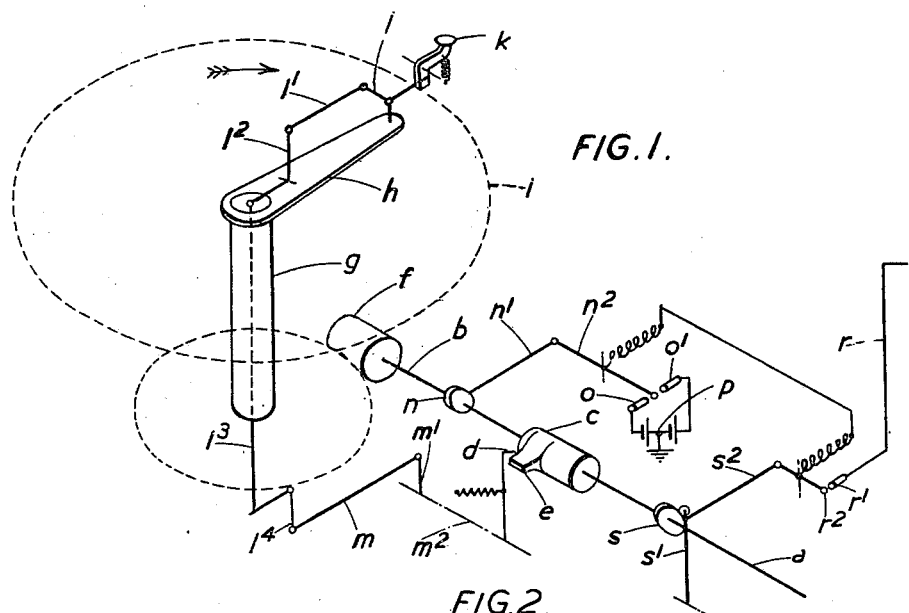
Figure 1 is a diagrammatic drawing of one form of apparatus in accordance with the invention.

The interrupter contacts interposed between the telegraph transmitting contacts $oo^1$ and the line $r$ in accordance with this modification are arranged so that the line $r$ is connected to a moving contact $r^3$, moving from one fixed contact $r^4$ to another $r^5$ at a constant rate, the transits during signalling taking place midway between transits of the transmitter contact tongue $n^2$. One of the fixed contacts $r^5$ is connected to earth and the other is connected to the transmitter contact tongue $n^2$ which itself moves between the fixed contacts $oo^1$ connected to the opposite polarities of a split battery $p$ as described with reference to Figure 1.

What is claimed is:

1. Telegraph transmitting apparatus comprising a line circuit, signalling means, a current source, a rotatable shaft controlled by said signalling means, switching means controlled by said rotatable shaft for connecting said current source to said line circuit and for reversing the polarity of said current source, a continuously rotating shaft, an interrupter in said line circuit controlled by said continuously rotating shaft for continuously interrupting said line circuit and means for rotating said rotatable shaft in synchronism with said continuously rotating shaft.

2. Telegraph transmitting apparatus comprising a line circuit, signalling means, a current source, a rotatable shaft, a cam on said rotatable shaft, a reversing switch controlled by said cam for reversing the polarity of a connection from said current source to said line circuit, a continuously rotating shaft, a cam on said continuously rotating shaft, an interrupter in said line circuit controlled by said last-mentioned cam, clutch means for coupling said rotatable shaft to said continuously rotating shaft only when said continuously rotating shaft is in a predetermined position, and means under the control of said signalling means for actuating said clutch means.

3. Telegraph transmitting apparatus for the transmission of step-by-step telegraph signals according to claim 2, wherein said signalling means comprises a keyboard mechanism and means actuated upon depression of a key for actuating said clutch means and for holding the clutch means actuated whilst said rotatable shaft rotates an amount dependent upon both the key depressed and upon the previous key depressed.

4. Telegraph transmitting apparatus according to claim 2, wherein said cams are so shaped that said reversing switch is actuated during periods when said line circuit is interrupted by said interrupter.

5. Telegraph transmitting apparatus according to claim 2, wherein said interrupter is provided with a grounded contact for connecting the said line circuit to earth during the intervals in which the current is interrupted.

6. Telegraph transmitting apparatus according to claim 2 wherein said reversing switch comprises a tongue movable between a pair of fixed contacts connected to opposite sides of said current source and said interrupter comprises another tongue and a fixed contact connected to line, and wherein a conductor interconnects said tongues.

7. Telegraph transmitting apparatus according to claim 2, wherein said reversing switch comprises a tongue movable between a pair of fixed contacts connected to opposite sides of said current source and said interrupter comprises another tongue movable between another pair of fixed contacts one of which is connected to ground and the other of which is connected to said first-mentioned tongue, and wherein said first-mentioned tongue is connected to line.

ALFRED EDWARD THOMPSON.

REFERENCES CITED

The following references are of record in the file of this patent:

UNITED STATES PATENTS

| Number | Name | Date |
| --- | --- | --- |
| 2,175,847 | Mathes | Oct. 10, 1939 |